United States Patent [19]

Politi

[11] Patent Number: 4,802,504

[45] Date of Patent: Feb. 7, 1989

[54] TAP WITH FLOW LIMITER FOR GAS BOTTLES

[75] Inventor: Jean-Marie Politi, Pontault-Combault, France

[73] Assignee: L'Air Liquide, Paris, France

[21] Appl. No.: 893,356

[22] Filed: Aug. 5, 1986

[30] Foreign Application Priority Data

Aug. 14, 1985 [FR] France ............... 85 12381

[51] Int. Cl.⁴ .................. F16K 47/08; F17C 13/04
[52] U.S. Cl. .................. 137/454.5; 137/613;
137/505.42; 137/883; 251/118
[58] Field of Search .............. 137/454.5, 505.42, 613;
251/118

[56] References Cited

U.S. PATENT DOCUMENTS

| | | | |
|---|---|---|---|
| 1,210,891 | 1/1917 | Blanchard et al. | 137/454.5 X |
| 2,160,025 | 5/1939 | Martin | 137/505.42 X |
| 2,553,763 | 5/1951 | Hammon | |
| 2,906,288 | 9/1959 | Young | 137/505.42 X |
| 4,210,168 | 7/1980 | Yonezawa | 137/454.5 |
| 4,263,939 | 4/1981 | Bird | 251/118 X |

FOREIGN PATENT DOCUMENTS 0123855 7/1984 European Pat. Off. .
1286061 1/1961 France .

Primary Examiner—Arnold Rosenthal
Attorney, Agent, or Firm—Lee C. Robinson, Jr.

[57] ABSTRACT

A tap for a bottle of compressed or liquified gas has fitted therein a flow limiter in the form of a cartridge internally comprising a first, upstream chamber receiving the gas coming from the bottle, a second, downstream chamber opening into a supply line and a calibrated passage connecting the first and second chambers. A flow control assembly comprising a valve associated with a calibrated control element and an expansion chamber is preferably arranged to control the flow between the first and second chambers. The tap has particular utility in bottles for transfer of toxic and/or spontaneously inflammable gases, since it prevents major leaks from such bottles or from supply lines fed therefrom.

10 Claims, 3 Drawing Sheets

TAP WITH FLOW LIMITER FOR GAS BOTTLES

BACKGROUND OF THE INVENTION

The present invention relates to a flow limiter device for the gas bottles intended to contain a gas which is compressed or liquified under pressure.

DESCRIPTION OF THE PRIOR ART

Bottles are currently utilised in industry which comprise a conventional screw-down valve operable, depending on its position, to close or open a user circuit.

Certain gases which are utilized in industry in the compressed state, or liquified under pressure in metal bottles provided with a tap, are extremely toxic and/or spontaneously inflammable when in contact with the air.

In case of leakage at the utilising plant, products of this nature are not without danger to the workforce. They may also cause substantial material damage and atmospheric pollution.

SUMMARY OF THE INVENTION

It is an object of the present invention to minimise the disastrous consequences caused by an escape from the utilising plant of a gas of the kind referred to above.

This object is attained in accordance with the invention by a tap for bottles intended to contain a gas which is compressed or liquified under pressure, said tap being provided with a flow limiter device formed at least two chambers in communication via a calibrated passage, a first and so-called upstream chamber receiving the gas coming from the bottle, and the other so-called downstream chamber, being in communication with the consumer circuit, wherein said flow limiter device is in the form of a cartridge which may be installed in hermetic manner within a housing wrought within the body of the tap for this purpose.

In a preferred embodiment of the invention the cartridge is arranged to form a third and so-called expansion chamber between the first chamber and the calibrated passage, supplied with gas through a valve which is associated with calibrated control means and also with a return device. A flow limiter device of this kind will be referred to in the following as a "limiter-expander", whereas a limiter lacking an expansion chamber is referred to as a "simple limiter".

A cartridge provided with a simple limiter is intended more specifically to be associated with a tap for a bottle containing a gas under low pressure, whereas a cartridge provided with a limiter-expander is intended more particularly as equipment for a tap for a bottle containing a gas under high pressure, as will emerge from the following.

The gas flow available may be limited, at the very source, by means of a system of this nature, to the lowest value commensurate with utilisation. The flow limiter device is of course devised as a function of the pressure of the gas present in the bottle.

Given that the delivery of the available gas is organised at the very source on the one hand, and that on the other hand, this flow has a minimum value commensurate with utilisation, it will be grasped that in case of a pipe fracture beyond the tap, the leak will be a minimum whereas in conventional taps, the gas was free to escape at a speed dependent on the leak in the case of an escape between the tap and optional expansion means, with all the disadvantages referred to above.

In one embodiment of the invention, the body of a tap which comprises a tap key operating a valve, an end piece for connecting the tap to the bottle, and an end piece for connection of the consumer circuit, has formed within this latter end piece a housing or recess to receive a cartridge, the latter being situated downstream of the said valve.

In another embodiment, it is the end piece formed on the tap body for its removable installation on a bottle which receives a cartridge; the latter is then situated in the actual interior of the bottle, upstream of the valve associated with the tap key. In another embodiment, the end piece formed on the tap body for removable installation of the tap on the bottle is extended towards the inside of the bottle by a tubular stub on which is secured in any appropriate manner a cartridge carrier socket which, given the structure in question, is consequently situated in the very interior of the bottle, upstream of the valve associated with the valve key.

According to a further embodiment of the invention, the cartridge is joined to the tap by being screwed into a screw-thread formed in the said recess, and it has a front or leading surface arranged to co-operate with a sealing gasket previously placed in position in the said recess.

According to another feature of the invention, the cartridge comprises—within its upstream chamber—a valve arranged to be actuated by a valve lifter rod formed integrally with calibrated control means, and between the upstream chamber and the calibrated opening, an expansion chamber in communication with the downstream chamber.

The taps provided in this manner with a cartridge comprising a simple limiter device or a limiter-expanded device, consequently substantially improve safety in the distributor circuit.

As a matter of fact, the breakdown of the distributor circuit, irrespective of the nature of the breakdown or whether it is close to or distant from the bottle, allows no more than a minute quantity of gas to escape (gas delivery at the minimum value commensurate with utilisation), whereas in bottles used hitherto, in case of failure of the plant between the expander and the bottle, the gas escaped freely whilst the tap key remained unused for closure of the circuit.

Other features and advantages of the invention will emerge moreover from the following description taken in conjunction with the accompanying drawings wherein preferred embodiments of the invention are illustrated.

DETAILED DESCRIPTION OF THE PREFERRED EMBODIMENTS

Figure 1:
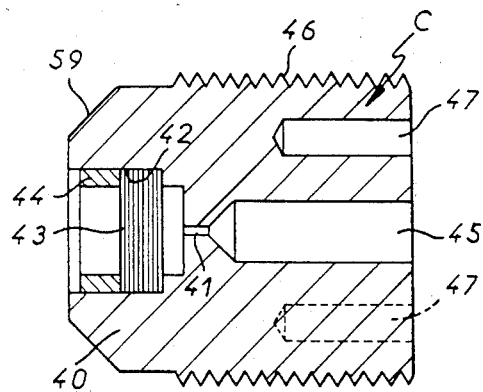
FIG. 1 shows a cartridge comprising a simple flow limiter device according to a first embodiment of the invention, in longitudinal cross-section.

FIG. 1 shows a simple flow limiter device comprising a cartridge C. This cartridge comprises a barrel 40 wherein are formed at either end of a calibrated axial passage 41, a first, upstream chamber 42 to receive a filter 43 secured by a retainer ring 44, and a second, downstream chamber 45, these two chambers being spaced apart on one and the same longitudinal axis.

It is specified that, in this case, the upstream chamber is that which is intended to receive the gas comining from the bottle, whereas the downstream chamber is that which is intended to feed the gas into the consumer circuit.

The cylindrical body of revolution 40 is screw-threaded at 46 on its external surface to allow removable installation of the cartridge in an appropriate recess formed for this purpose in a tap body as will emerge in the following. Blind holes 47—for example being two diametrical holes which are formed in the rear surface of the cartridge, are intended to receive the studs of a tool (not illustrated herein) devised for its installation on a tap body, a system of this nature being intended to prevent any dismantling by an unauthorised person. The blind holes may be replaced by a slot, or else by a twin cross-shaped slot.

Figure 2:
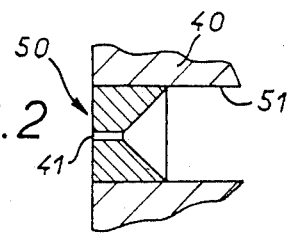
FIGS. 2 and 3 are partial cross-sectional illustrations of two types of calibrated passage for the taps of the invention.
Figure 3:
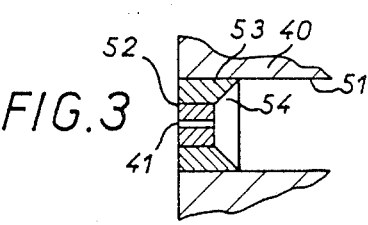

The calibrated passage 41 which in the example illustrated in FIG. 1 is formed within the mass of the barrel, may also as shown in FIG. 2, be formed in a plug 50 inserted in a bore 51 in a force-fit, or interference fit. As shown by FIG. 3, it may also be formed in a ring 52 engaged within another ring 53 inset in an interference fit in a bore 51 provided in the barrel 40 and provided at the rear with a conical surface 54 diverging from the inside towards the outside.

Tapering towards its front surface, the cartridge C comprises a frustoconical surface 59 the purpose of which will emerge in the following.

A simple flow limiter of this kind is highly suitable if the pressure available within the bottle is moderate and the pressure of application is low, for example lower than five bars, and the difference between these two pressures is sufficiently small, for example if the value of the pressure in the bottle does not exceed 4 to 5 times that of the application pressure.

For a given calibrated passage, the flow variation is effectively and substantially proportional to the pressure variation upstream of this passage.

In the case, however, in which the pressure available in the bottle is substantial, for example greater than 20 or 30 bars and/or it is desired at all costs to restrict the leakage flow to the utilisation flow throughout the period of operation of the gas bottle, it is necessary to provide the latter with a "limiter-expander" cartridge.

Figure 4:
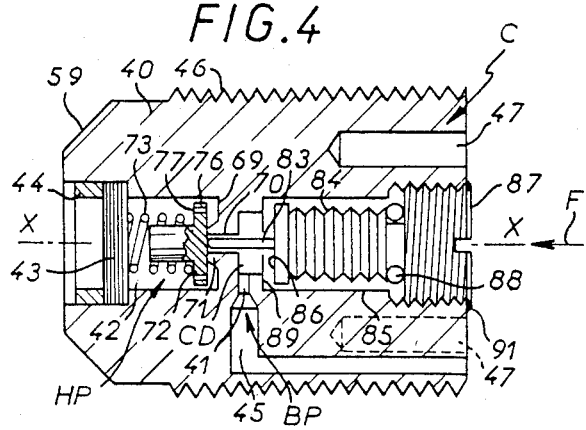
FIG. 4 shows a cartridge according to a second embodiment comprising a "limiter-expander" device, considerably enlarged and in longitudinal cross-section.
Figure 5:
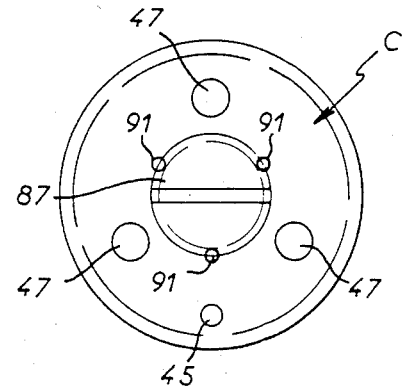
FIG. 5 is an end view in the direction of arrow F of the cartridge of FIG. 4.

The cartridge C comprising a "limiter-expander" device shown in FIGS. 4 and 5 also comprises a cylindrical body of revolution 40 having a front section with a frustoconical surface 59.

Along the axis X—X of the barrel 40, the cartridge comprises a first high-pressure (HP) chamber 42 and a second low-pressure (BP) chamber 45. The first chamber is delimited by a base 69 comprising a passage 70, and a valve seat 71 for a valve 72 kept in position by a spring 73, bearing on a filter 43 which for its part is held in position by means of a ring 44.

The valve 72 comprises a flange 76 having a series of holes 77, for example three.

Between the valve seat 71 and the radial calibrated passage 41, the barrel 40 comprises an expansion chamber CD which is in communication with the second low-pressure chamber 45. The chamber 45 in this case by a passage opening in the rear surface of the cartridge C.

The passage 70 loosely accommodates, a valve lifter rod 83 integral with calibrated control means, these means adavntageously comprising a metal bellows 84 placed in position in a chamber 85. The bellows 85 has a front surface 86 facing towards the expansion chamber CD and a free extremity exposed to the action of an adjusting screw 87. A toroidal gasket 88 assures sealing, whereas the front surface 86 of the metal bellows is arranged to co-operate with a bearing surface 89 formed in the base of the bore 85.

Blind longitudinal holes 47 allow the insertion of a matching handling key or spanner, whereas the immobilization of the adjusting screw 87 with respect to the barrel is advantageously assured for example by means of spot welds 91.

In a manner resembling that of the barrel of the cartridge C in FIG. 1, the barrel of the cartridge comprises a screw-thread 46 on its outer surface.

The metal bellows 84 forms a hermetic volume and acts as an expansion spring; the pressure of the gas within the bellows serves the purpose of a reference pressure the force of which is added to that of the spring formed by the metal bellows 84.

A cartridge C of this nature may be incorporated in any tap body as will become apparent in the following.

Figure 6:
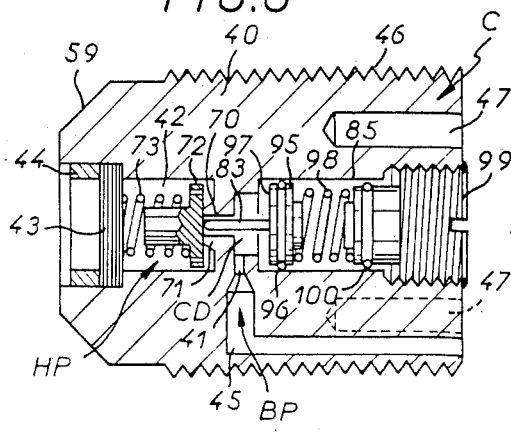
FIGS. 6 and 7 show respectively—in longitudinal cross-section—third and fourth embodiments of cartridges in accordance with the invention, both comprising a "limiter-expander" device.

According to a third embodiment shown in FIG. 6, the cartridge C comprises a barrel 40 analogous to that shown in FIG. 4, which a first high-pressure upstream chamber 42 and a low-pressure downstream chamber; as in the embodiments described above, the high-pressure upstream chamber comprises a filter 43 secured by a ring 44, a valve 72 exposed to the action of a retaining spring 73, a valve seat 71, an expansion chamber CD, a calibrated radial passage 41 and an expansion chamber formed by a duct 45. The barrel also has blind holes 47 for an appropriate tool, as well as a bore 85 wherein is engaged a piston 95 having a peripheral seal 96, instead of the aforesaid metal bellows; the front surface 97 of the piston is extended towards the upstream high-pressure chamber HP by a valve lifter rod 83, slidingly fitted with play in the passage 70 to establish an annular space.

At its rear surface, the piston 95 co-operates with calibrated control means for the valve lifter rod which, in the present case, comprise an expansion spring 98 whose force may be modulated by means of an adjusting screw 99 having an internal terminal part provided with a sealing joint 100.

According to a fourth embodiment shown in FIG. 7, the cartridge C comprises a barrel 40 analogous overall to the preceding embodiments comprising a first high-pressure upstream chamber HP, a second low-pressure downstream chamber BP, and an expansion chamber CD; the same reference numerals are used again to denote elements already described with reference to the two preceding embodiments.

In this embodiment, the cartridge C comprises calibrated control means differing in structure inasmuch as they comprise an internal screw-thread 102 which receives a hollow screw 103. A spring 105 is inserted in the screw 103. One extremity of the spring 105 bears on a diaphragm 106 to which is secured the valve lifter rod 83, and the other extremity bears against a spacer 107.

It should be noted that the inner extremity 108 of the hollow screw 103 co-operates with a gasket 109 designed to assure sealing. The compressive forces of the spring 105 may easily be adjusted by placing in position one or more spacers 107 of appropriate thickness.

The aforesaid diaphragm 106 may be of any kind, for example flat, corrugated or convex, of metal or other appropriate material.

One or other of the cartridges C above is appropriate to equip taps of different kinds for bottles containing a gas which is compressed or liquified under pressure.

Figure 8:
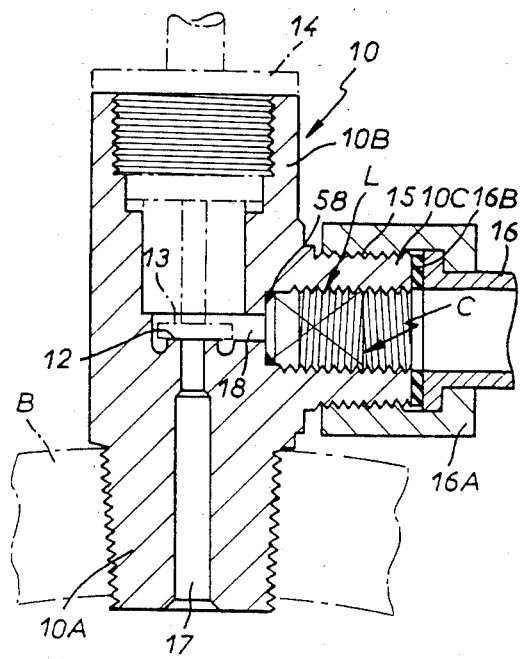
FIGS. 8 to 13 are longitudinal sectional views illustrating different tap bodies each provided with a cartridge comprising a flow limiter in accordance with the invention.

In FIG. 8, a tape comprises a barrel 10 having three end pieces 10A, 10B, 10C respectively; the end piece 10A or tap shank is intended to be connected to the neck of a bottle B shown by broken lines; the end piece 10B comprises a seat 12 to co-operate with a valve 13 which may be handled by means of a tap key 14, whereas the end piece 10C which is substantially radial is externally screw-threaded at 15 for the purpose of connecting a pipe 16 which may be of any suitable type to the consumer circuit, by means of a cap nut 16A and of a gasket 16B. The tap body internally comprises a duct 17 extending within the end piece 10A, as far as the valve seat 12 and downstream of the said seat, towards the end piece 10C via a passage 18.

According to the invention, the end piece 10C of the tap body 10 is provided internally with a tapped recess L to accommodate a cartridge C in hermetic manner by means of toroidal seal 58 co-operating with the frustoconical surface 59 (FIG. 1). A cartridge of this nature is consequently situated downstream of the valve 13 on the trajectory of the duct between the inside of the bottle and the consumer circuit. The cartridge may comprise a simple limiter device, or a limiter-expander device. It may be noted that the aforesaid toroidal seal may be replaced by a flat seal, the front section of the cartridge being organised for this purpose.

Figure 9:
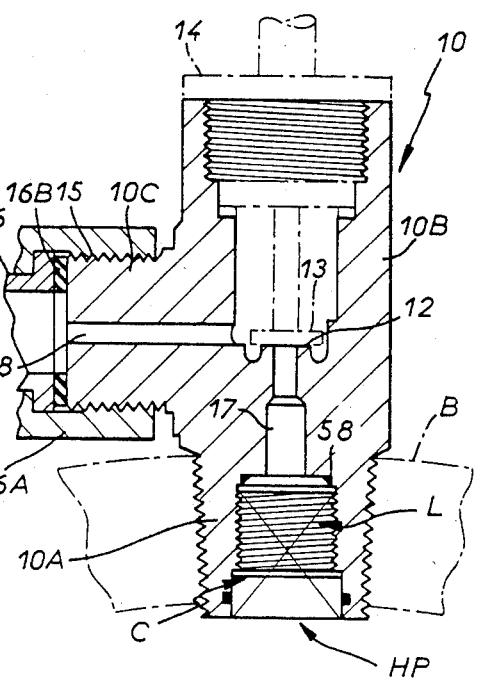

In the embodiment shown in FIG. 9, the tap body generally indicated by 10 comrpises as previously, a first end piece 10A intended to be connected to the neck of the bottle B. A second end piece 10B is arranged to receive a tap key 14 operating a valve 13 with respect to the seat 12, and a third end piece 10C is directed at right angles to the preceding end pieces. They are arranged for connection of a pipe 16 to any desired apparatus (not illustrated), or to an evacuation device or filling device for the bottle.

The tap body also comprises an axial passage 17 and a second passage 18 formed in the end piece 10C, these two passages being liable to be placed in communication or separated depending on the position imparted to the valve 13 on its seat 12.

As illustrated, the first end piece 10A is provided with a tapper recess L for reception of a cartridge C.

It will be observed that, according to this embodiment, the filling of the bottle B, or its evacuation, may raise some problems because operations of this nature must necessarily be carried out via the cartridge C. For filling or evacuation purposes, the pipe 16 is connected to the end piece 10C, whereupon the valve 13 of the tap key 14 is opened and this valve is closed once the operations are completed.

Figure 10:
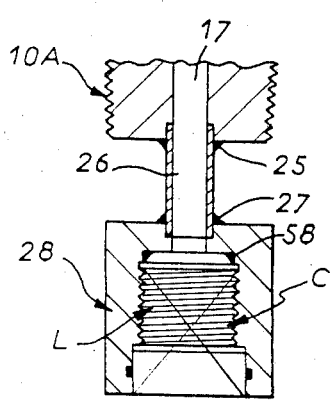

In FIG. 10, the end piece 10A of the tap body is arranged to receive a tube section 26 attached by a weld 25, a socket 28 being attached to the tube section, by means of a weld 27, to receive a cartridge C.

In both embodiments referred to in the foregoing and illustrated by FIGS. 9 and 10, the cartridge which is placed on the trajectory of the duct 17 is situated within the bottle which may give rise to particular limitations during application, as has been stated in the foregoing.

As a matter of fact, it will be appreciated that it is impossible to dismantle the cartridge C in the embodiments shown in FIGS. 9 and 10 for the purpose of evacuating or filling operations.

The cartridge C is preferably incorporated in the tap body downstream of the valve 13, outside the bottle B as illustrated in FIGS. 8, 11, 12 and 13.

In the case of FIG. 8, it is possible and indeed preferable to dismantle the cartridge C when a vacuum has to be established or the gas bottle has to be filled, so that these operations are not performed under limitations which would increase the duration of these operations.

Figure 11:
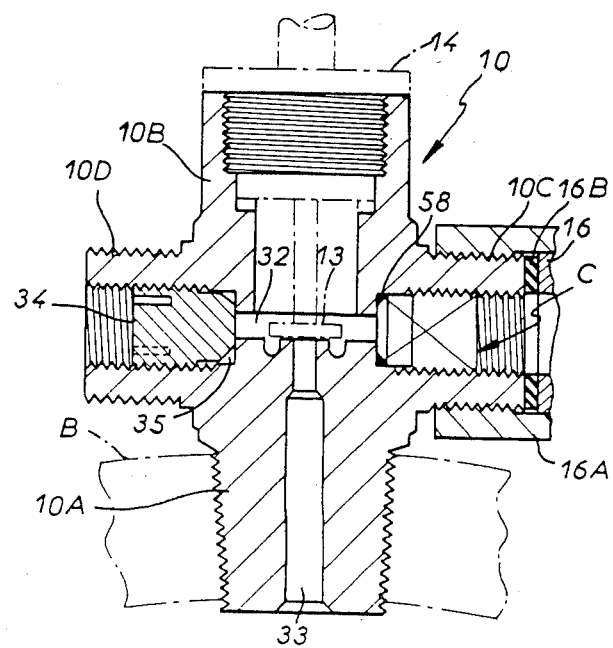

In FIG. 11, the tap body 10 comprises four cruciformly positioned end pieces. The end pieces comprise a first end piece 10A forming a tap shank to be screwed into the neck of a bottle B, and a second end piece 10B arranged to carry a tap key 14 and having its valve 13 co-operating with a seat 12. At right angles to the aforesaid end pieces 10A and 10B, the tap body 10 comprises two extensions forming end pieces 10C and 10D situated at either side of the valve 13. A duct 32 places the two end pieces 10C and 10D in communication, and a duct 33 places the inside of the bottle in communication with the duct 32 when the valve 13 is open. A configuration of this nature is preferable, since it allows evacuation and scavenging of the internal chamber 32 of the tap corresponding to the high-pressure chamber 42 (FIG. 1) of the flow limiter.

One of the end pieces, being the end piece 10D in this case, receives a removable plug 34, and the other receives a cartridge C. In this embodiment, the plug 34 bears on a sealing joint 35 and may easily be removed for evacuating or refilling the bottle B and placed in position again thereafter, thus averting any handicap during the said operations.

Figure 12:
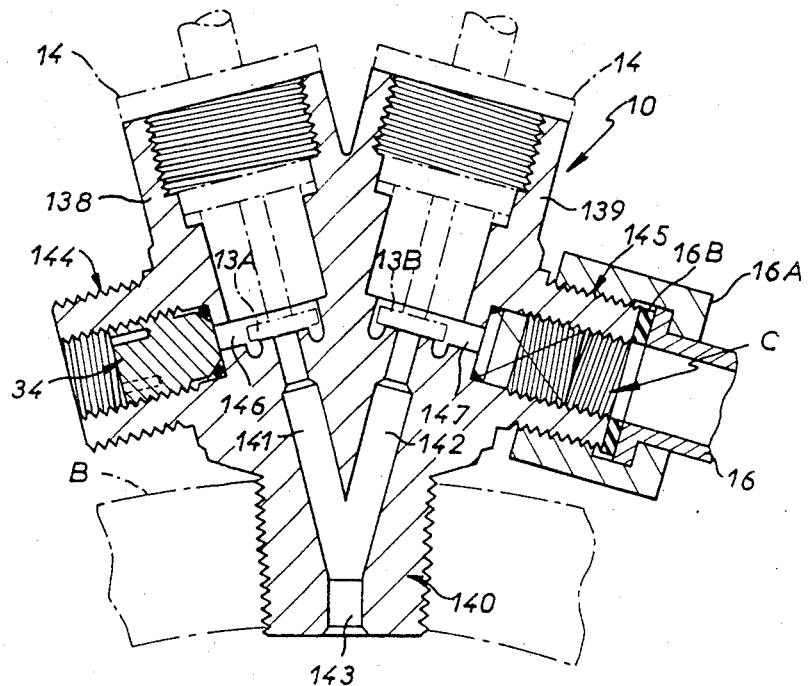

In FIG. 12, the body 10 of the tap has a Y-shaped overall layout; the branches of the Y form two divergent end pieces 138, 139, each being adapted to receive a tap key 14, whereas the single branch of the Y forms an end piece 140 which comprises a tap shank to be screwed into the neck of a bottle B. Two ducts 141,142, branch off into the end pieces 138,139 from a single duct 143 in the end piece 140 whose orifice opens inside the bottle B.

The tap body above also comprises two lateral end pieces 144,145 substantially confronting each other, these being arranged to receive a plug 34 in the one case and a cartridge C in the other.

Upstream of the valve 13A, a passage 146 opens into the end piece 144, and downstream of the valve 13B, a passage 147 opens within the end piece 145, so that each valve 13A, 13B may be operated separately according to the requirements of the filling, evacuation or utilization of the bottle.

The filling or evacuation of a bottle equipped in this manner is performed easily via the ducts 146, 141, 143 after withdrawal of the plug 34 and opening of the valve 13A, whereas the ducts 143, 142, 147 are arranged to convey the product to the application stage when the plug 34 is in position again and the valve 13A is closed, whilst the other valve 13B is open.

Figure 13:
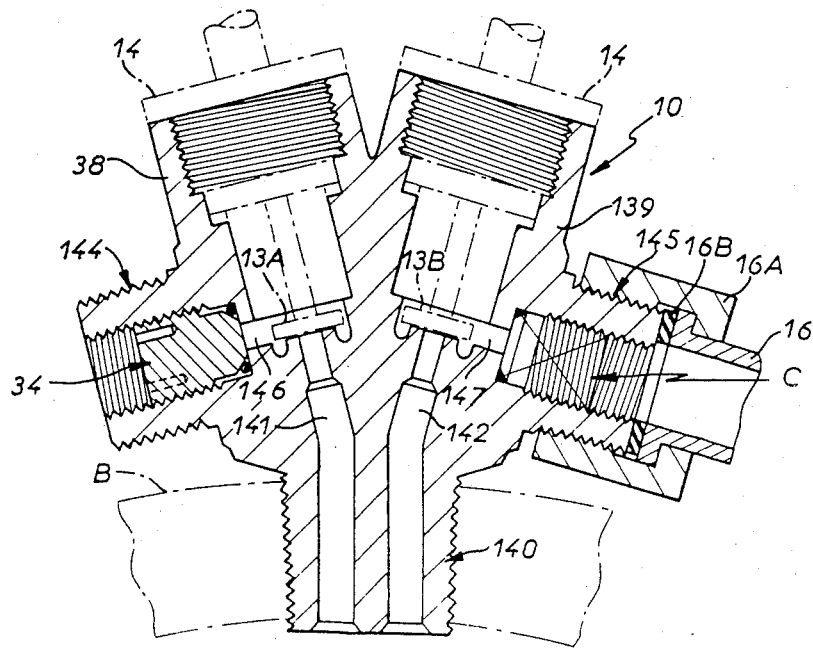

In FIG. 13, the tap body 10 is analogous overall to that described with reference to FIG. 12, subject to the difference that each of the ducts 141, 142, closable by means of the valve 13A, 13B of the tap keys 14, opens inside the bottle B, one of the end pieces (144) receiving a removable plug 34, and the other an optional cartridge C comprising a simple limiter device or a limiter-expander device.

In this embodiment, the filling or evacuating operations on the bottle B may be performed once the plug 34 is removed, the valve 13A is opened and the valve 13B is closed, whereas during use, it is the valve 13A which is closed and the valve 13B which is opened to allow gas to flow via the ducts 146, 147 and any cartridge C, and thence to the consumer facility.

The gas flow supplied by the limiter device formed by the cartridge C having a simple limiter is evidently a function of the calibrated passage orifice. As for the "limiter-expander" device, its operation may be established as follows.

The valve or valves of the tap keys being closed, there is evidently no pressure within the expansion chamber CD upstream of the calibrated passage 70. By virtue of its inherent expansion force, the metal bellows 84 (FIG. 4) acts on the valve 72 via the valve lifter rod 83, the stroke of the metal bellows and hence that of the valve lifter rod being limited by impingement of the front surface 86 of the bellows on the bottom 89 of the bore 85.

Conversely, when the tap is open, the circuit is placed under load and the high-pressure section HP of the cartridge C receives gas, the valve 72 being lifted off the seat 71 by the valve lifter 83, with the result that the gas is allowed to enter the expansion chamber CD through the passage 70 formed in the valve seat. The gas exerts a pressure throughout the front surface of the metal bellows whilst compressing it, and the valve lifter rod 83 is consequently moved rearwards. The valve 72 then assumes its closed position on the seat 71 so that the penetration of the fluid which is to be expanded into the expansion chamber CD is stopped. When the pressure drops in the expansion chamber, the force of the spring bellows 84 pushes the valve 72 back to a balanced position.

The delivery rate of the gas is determined by: the pressure prevailing in the expansion chamber CD, the cross-section of the calibrated orifice 81 and the pressure of the consumer circuit. The pressure in the expansion chamber is determined by the metal bellows 82, adjustable in respect of compression by means of the adjusting screw 87.

Figure 7:
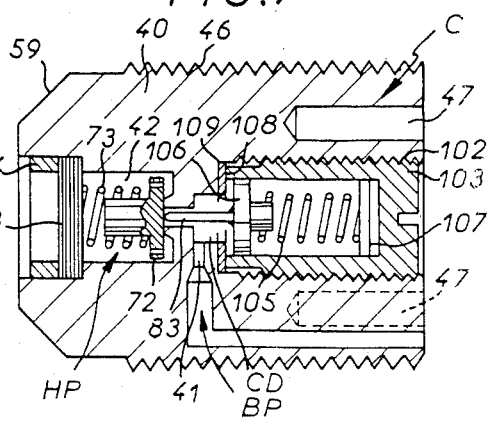

The operation of the cartridge C shown in FIGS. 6 and 7 will not be described in detail since it is analogous to that which has been described.

While certain preferred embodiments of the invention have been illustrated by way of example in the drawings and particularly described, it will be understood that the invention is in no way limited to the embodiments shown and that various modifications may be made without departing from the scope of the following claims.

What is claimed is:

1. A tap for a bottle of pressurized gas comprising a tap body having a recess therein and having means for attachment to a gas supply line, a flow limiter device in the form of a cartridge hermetically attachable within said recess, said cartridge defining a first, upstream, chamber communicating with said gas bottle attachment means a second, downstream, chamber communicating with said supply line attachment means, and an open unobstructed calibrated passage whereby said first chamber is in communication with said second chamber, the calibrated passage having a length several times its maximum transverse dimension and a predetermined constant volume, said cartridge defining a third, expansion chamber between and communicating with said first chamber and said calibrated passage, a valve within one of said chambers for controlling gas flow from said first chamber to said third chamber, calibrated control means in engagement with said valve, and spring means for biasing said valve.

2. A tap as claimed in claim 1, wherein said calibrated control means is inserted into the cartridge and comprises a valve lifter rod, a bellows associated with the valve lifter rod, and an adjusting screw connected to one bellows.

3. A tap as claimed in claim 1, wherein said calibrated control means comprises a valve lifter rod, a piston connected to the valve lifter rod, a hollow screw disposed around the piston, spring means in contact with the piston, and washer means bearing against the spring means for adjusting the same.

4. A tap as claimed in claim 1, which further comprises web means separating the upstream chamber from the expansion chamber, and a seat formed on said web means in cooperating relationship with said valve.

5. A tap for a bottle of pressurized gas comprising a tap body having a recess therein and having means for attachment to said gas bottle and means for attachment to a gas supply line, and a flow limiter device in the form of a cartridge hermetically attachable within said recess, said cartridge defining a first, upstream, chamber communicating with said gas bottle attachment means, a second, downstream, chamber communicating with said supply line attachment means, a calibrated passage whereby said first chamber is in communication with said second chamber and a third, expansion, chamber between and communicating with said first chamber and said calibrated passage, said cartridge having a valve within one of said chambers for controlling gas flow from said first chamber to said third chamber, calibrated control means in engagement with said valve, and spring means for biaing said valve, said calibrating control means including a valve lifter rod, a piston connected to the valve lifter rod, said spring means bearing against said piston, and screw means in contact with the spring means for adjusting the same.

6. A tap for a bottle of pressurized gas comprising a tap body having a recess therein and having means for attachment to said gas bottle and means for attachment to a gas supply line, and a flow limiter device in the form of a cartridge hermetically attachable within said recess and having a frustoconical surface and a sealing joint within said recess in contact with said surface, said cartridge defining a first, upstream, chamber communicating with said gas bottle attachment means, a second, downstream chamber communicating with said supply line attachment means and a calibrated passage whereby said first chabmer is in communicatin with said second chamber.

7. A tap for a bottle of pressuraized gas comprising a tap body having a recess therein and having means for attachment to a gas supply line, a flow limiter device in the form of a cartridge hermetically attachable within said recess, said cartridge defining a first, upstream, chamber communicating with said gas bottle attachment means, a second, downstream, chamber communicating with said supply line attachment means, and an open unobstructed calibrated passage whereby said first chamber is in communication with said second chamber, the calibrated passage having a length sveral times its maximum dimension and a predetermined constant volume, a filter within said upstream chamber, and a retention ring for holding the filter within the upstream chamber.

8. A tap for delivering pressurized fluid from a container to a supply line, the tap comprising, in combination:
- a tap body having an inlet duct and a discharge duct including an enlarged recess;
- first valve means movable within the tap body for admitting fluid from the inlet duct to the discharge duct;
- a flow limiter cartridge removably positioned in the enlarged recess in said discharge duct, the cartridge defining an upstream chamber, a calibrated passage, an expansion chamber and a downstream chamber interconnected in that order within the cartridge, the upstream chamber communicating with the first valve means and the downstream chamber communicating with the discharge duct;
- second valve means disposed within the flow limiter cartridge between the upstream chamber and the calibrated passage, the second valve means being movable between an open position and a closed position; and
- means for biasing the second valve means toward its open position, the movement of the first valve means in a direction to admit fluid from the inlet duct to the discharge duct pressurizing the upstream chamber, the calibrated passage and the expansion chamber to move the second valve means toward its closed position.

9. A tap for delivering pressurized fluid from a container to a supply line, the tap comprising, in combination:
- a tap body having an inlet duct and a discharge duct including an enlarged recess;
- first valve means movable within the tap body for admitting fluid from the inlet duct to the discharge duct;
- a flow limiter cartridge removably positioned in the enlarged recess in said discharge duct, the cartridge defining an upstream chamber, a calibrated passage, an expansion chamber and a downstream chamber interconnected in that order within the cartridge, the upstream chamber communicating with the first valve means and the downstream chamber communicating with the discharge duct;
- second valve means disposed within the flow limiter cartridge between the upstream chamber and the calibrated passage, the second valve means being movable between an open position and a closed position; and
- means for biasing the second valve means toward its open position, the movement of the first valve means in a direction to admit fluid from the inlet duct to the discharge duct pressurizing the upstream chamber, the calibrated passage and the expansion chamber to move the second valve means toward its closed position; and
- means connected to the biasing means for adjusting the same, to thereby vary the pressure at which the second valve means moves toward its closed position.

10. A tap for delivering pressurized fluid from a container to a supply line, the tap comprising, in combination:
- a generally cylindrical tap body having an axially extending inlet duct and a discharge duct including an enlarged recess extending radially with respect to the inlet duct;
- first valve means axially movable within the tap body for admitting fluid from the inlet duct to the discharge duct;
- a flow limiter cartridge removably positioned in the enlarged recess in said discharge duct, the cartridge defining an upstream chamber, a calibrated passage, an expansion chamber and a downstream chamber interconnected in that order within the cartridge, the upstream chamber communicating with the first valve means and the downstream chamber communicating with the discharge duct;
- second valve means disposed within the flow limiter cartridge between the upstraem chamber and the calibrated passage, the second valve means being radially movable between an open position and a closed position;
- means for biasing the second valve means toward its open position, the movement of the first valve means in a direction to admit fluid from the inlet duct to the discharge duct pressurizing the upstream chamber, the calibrated passage and the expansion chamber to move the second valve means toward its closed position; and
- means connected to the biasing means for adjusting the same, to thereby vary the pressure at which the second valve means moves toward its closed position.

* * * * *